(12) United States Patent
Ikuta et al.

(10) Patent No.: US 9,496,807 B2
(45) Date of Patent: Nov. 15, 2016

(54) ELECTROSTATIC INDUCTION POWER GENERATOR

(75) Inventors: Masayo Ikuta, Kizugawa (JP); Kenji Sakurai, Kizugawa (JP); Wataru Okada, Kusatsu (JP)

(73) Assignee: OMRON Corporation, Kyoto (JP)

( * ) Notice: Subject to any disclaimer, the term of this patent is extended or adjusted under 35 U.S.C. 154(b) by 946 days.

(21) Appl. No.: 13/512,624

(22) PCT Filed: Dec. 24, 2010

(86) PCT No.: PCT/JP2010/073296
§ 371 (c)(1),
(2), (4) Date: Aug. 6, 2012

(87) PCT Pub. No.: WO2011/086830
PCT Pub. Date: Jul. 21, 2011

(65) Prior Publication Data
US 2013/0134830 A1 May 30, 2013

(30) Foreign Application Priority Data
Jan. 14, 2010 (JP) ................. 2010-005874

(51) Int. Cl.
| H02N 1/00 | (2006.01) |
| H02N 11/00 | (2006.01) |
| H02N 1/04 | (2006.01) |
| H02N 2/04 | (2006.01) |
| H02N 1/08 | (2006.01) |

(52) U.S. Cl.
CPC ...................... *H02N 1/08* (2013.01)

(58) Field of Classification Search
CPC ................. H02K 35/02; H02N 1/00
USPC ............... 310/309, 310, 300, 323.14
See application file for complete search history.

(56) References Cited

U.S. PATENT DOCUMENTS

2011/0266915 A1  11/2011  Matsubara et al.

FOREIGN PATENT DOCUMENTS

| JP | 63-95868 A | 4/1988 |
| JP | 63095868 A * | 4/1988 |
| JP | 10174460 A * | 6/1998 |

(Continued)

OTHER PUBLICATIONS

International Preliminary Report on Patentability and Written Opinion from PCT/JP2010/073296 mailed on Aug. 16, 2012 (9 pages).
International Search Report w/translation from PCT/JP2010/073296 dated Feb. 1, 2011 (2 pages).

(Continued)

*Primary Examiner* — Jose Gonzalez Quinones
(74) *Attorney, Agent, or Firm* — Osha Liang LLP

(57) ABSTRACT

An electrostatic induction power generator includes a spherical member for making a distance between surfaces of a first substrate and a second substrate facing each other constant. A housing is provided with a first reference surface to which a surface of the second substrate facing the first substrate is fixed and which is a positioning reference for the second substrate with respect to the surface facing the first substrate in a vertical direction, and a second reference surface with which the spherical member is slidably in contact and which is a positioning reference for the spherical member with respect to the surface facing the first substrate in the vertical direction. The spherical member is slidably in contact with a surface of the first substrate facing the second substrate.

15 Claims, 7 Drawing Sheets

(56) References Cited

FOREIGN PATENT DOCUMENTS

| JP | 2008113517 A | * | 5/2008 | |
|---|---|---|---|---|
| JP | 2008161036 A | * | 7/2008 | |
| JP | 2008-278607 A | | 11/2008 | |
| JP | WO 2009054251 A1 | * | 4/2009 | H02N 1/08 |
| JP | 2009-148124 A | | 7/2009 | |
| WO | 2009/054251 A1 | | 4/2009 | |

OTHER PUBLICATIONS

J. Boland et al.; "Micro Electret Power Generator"; Proc. 16th IEEE Int. Conf. MEMS; 2003; pp. 538-541 (4 pages).

Patent Abstracts of Japan Publication No. 63-095868 dated Apr. 26, 1988 (1 page).

Extended European Search Report in counterpart European Application No. 10843183.4 issued Jun. 24, 2015 (8 pages).

* cited by examiner

ELECTROSTATIC INDUCTION POWER GENERATOR

TECHNICAL FIELD

The present invention relates to an electrostatic induction power generator that can be used as a vibration power generator or the like for generating power using ambient vibration.

BACKGROUND ART

Conventionally, an electrostatic induction power generator is known in which a pair of substrates configured to be able to reciprocate relative to each other while maintaining a state in which the substrates face each other are provided, a plurality of electrets are arranged in a row on one of the pair of substrates, and a plurality of pairs of electrodes are arranged in a row on the other one of the pair of substrates. According to the electrostatic induction power generator, when the pair of substrates move relative to each other, an electrostatic capacitance between one electrode of a pair of electrodes and the electret changes and also an electrostatic capacitance between the other electrode of a pair of electrodes and the electret changes, so that a difference of the electrostatic capacitances is output as electric power.

In the electrostatic induction power generator, a distance between the electret and a pair of electrodes in a direction in which the pair of substrates face each other largely affects power generation performance. Therefore, it is important to improve the accuracy of the distance to improve the power generation performance. Therefore, conventionally, a technique is known which includes a member for adjusting a distance between a support member supporting one of a pair of substrates and a support member supporting the other substrate (see Japanese Patent Application Laid-Open No. 2009-148124 1).

The technique will be described with reference to FIG. 12. FIG. 12 is a schematic cross-sectional view of an electrostatic induction power generator according to a conventional example. The electrostatic induction power generator 200 includes a pair of substrates (referred to as a first substrate 220 and a second substrate 230 respectively). A plurality of electrets are arranged in a row on the first substrate 220 and a plurality of pairs of electrodes are arranged in a row on the second substrate 230. The first substrate 220 is supported by a first support member 211 and the second substrate 230 is supported by a second support member 212. The first substrate 220 is configured to be able to move in a direction in parallel with a surface of the substrate. The first substrate 220 and the second substrate 230 can move relative to each other while maintaining a state in which the first substrate 220 and the second substrate 230 face each other.

The electrostatic induction power generator 200 is provided with adjustment members 240 for adjusting a distance between the first support member 211 and the second substrate 230 fixed to the second support member 212. According to the technique, in a state in which the adjustment members 240 are disposed between the first support member 211 and the second substrate 230 fixed to the second support member 212, the adjustment members 240, the first support member 211, the second support member 212, and the second substrate 230 are fixed by bolts 250, so that the distance is adjusted.

However, as described above, the power generation performance is affected by the distance between the electret and a pair of electrodes in a direction in which the pair of substrates face each other. If it is possible to ignore the variation of the thickness of the electret and the variation of the thickness of the pair of electrodes, the distance between the surfaces of the pair of substrates facing each other affects the power generation performance.

Therefore, in the conventional example described above, the error propagation to the distance that affects the power generation performance is large. Specifically, in the conventional example described above, the distance between the first support member 211 and the second substrate 230 is adjusted. Therefore, a dimensional error that affects the accuracy of the distance between the surfaces of the first substrate 220 and the second substrate 230 facing each other includes a dimensional error of the adjustment members 240, a dimensional error of the first support member 211, and a dimensional error of the thickness of the first substrate 220.

Here, in the electrostatic induction power generator, the distance between the electret and a pair of electrodes in a direction in which the pair of substrates face each other is, for example, about 70 μm and the distance between the surfaces of the pair of substrates facing each other is, for example, about 85 μm. On the other hand, the tolerance of a glass substrate on which the electret and the like are formed is generally ±50 μm with respect to a desired thickness.

Therefore, in the conventional example described above, the dimensional error of the thickness of the first substrate 220 affects the accuracy of the distance between the surfaces of the pair of substrates facing each other, so that it takes time and cost to adjust the distance. Thus, for example, it is necessary to prepare a plurality of types of adjustment members 240 whose lengths are different from each other or adjust the length of the adjustment member 240 for each product.

CITATION LIST

Patent Literature

Patent Literature 1: Japanese Patent Application Laid-Open No. 2009-148124

Non-Patent Literature

Non-Patent Literature 1: J. Boland, Y. H. Chao, Y. Suzuki, Y. C. Tai. Proc. 16th IEEE Int. Conf. MEMS 2003, pp. 538-541

SUMMARY OF INVENTION

One or more embodiments of the present invention provide an electrostatic induction power generator which can easily improve the accuracy of a distance between surfaces of a pair of substrates facing each other.

One or more embodiments of the present invention involve the means described below.

An electrostatic induction power generator in one or more embodiments of the present invention includes a first substrate and a second substrate configured to be able to move relative to each other while maintaining a state in which the first substrate and the second substrate face each other, an electret provided on the first substrate, a first electrode and a second electrode provided on a surface of the second substrate facing the electret, and a housing containing the first substrate and the second substrate.

Electric power is output when a positional relationship between the electret and the first electrode changes and a positional relationship between the electret and the second electrode changes following a change of relative positions of the first substrate and the second substrate and thereby an electrostatic capacitance between the electret and the first electrode changes and an electrostatic capacitance between the electret and the second electrode changes.

A regulating member for making a distance between surfaces of the first substrate and the second substrate facing each other constant is provided.

The housing is provided with a first reference surface to which a surface of one substrate, which is one of the first substrate and the second substrate, facing the other substrate is fixed and which is a positioning reference for the one substrate with respect to the surface facing the other substrate in a vertical direction, and a second reference surface with which the regulating member is slidably in contact and which is a positioning reference for the regulating member with respect to the surface facing the other substrate in the vertical direction.

The regulating member is slidably in contact with a surface of the other substrate facing the one substrate.

According to one or more embodiments of the present invention, a dimensional error that affects the accuracy of the distance between the surfaces of the first substrate and the second substrate facing each other can be reduced to only a dimensional error of the regulating member and a dimensional error of the housing. Thereby, it is possible to eliminate effects of a dimensional error of the thickness of the substrates, which affects the distance between the surfaces of the first substrate and the second substrate facing each other.

The regulating member may be a rotatable member that rotates in conjunction with a movement of the other substrate.

Thereby, it is possible to smoothly move a substrate that moves (the other substrate) while maintaining a constant distance between the surfaces of the first substrate and the second substrate facing each other.

The rotatable member may be a spherical member or a roller.

The housing is provided with a guide groove that guides the rotatable member so that the rotatable member can roll and a bottom surface of the guide groove may be the second reference surface.

Thereby, it is possible to reduce sliding resistance of the regulating member (rotatable member).

The one substrate has a rectangular shape as seen in a direction perpendicular to the surface facing the other substrate and the first reference substrate may be provided at each of four corners of the one substrate.

Thereby, the one substrate is stably supported.

The configurations de scribed above can be employed by combining the configurations as much as possible.

As described above, according to one or more embodiments of the present invention, it is possible to easily improve the accuracy of the distance between the surfaces of a pair of substrates facing each other.

DESCRIPTION OF EMBODIMENTS

Hereinafter, aspects for implementing the present invention will be exemplarily described in detail on the basis of embodiments. Note that the size, material, shape, and relative position of components described in the embodiments do not limit the scope of the present invention unless otherwise particularly mentioned.

Embodiment 1

An electrostatic induction power generator according to Embodiment 1 of the present invention will be described with reference to FIGS. 1 to 7.

<Overall Configuration of Electrostatic Induction Power Generator>

Figure 1:
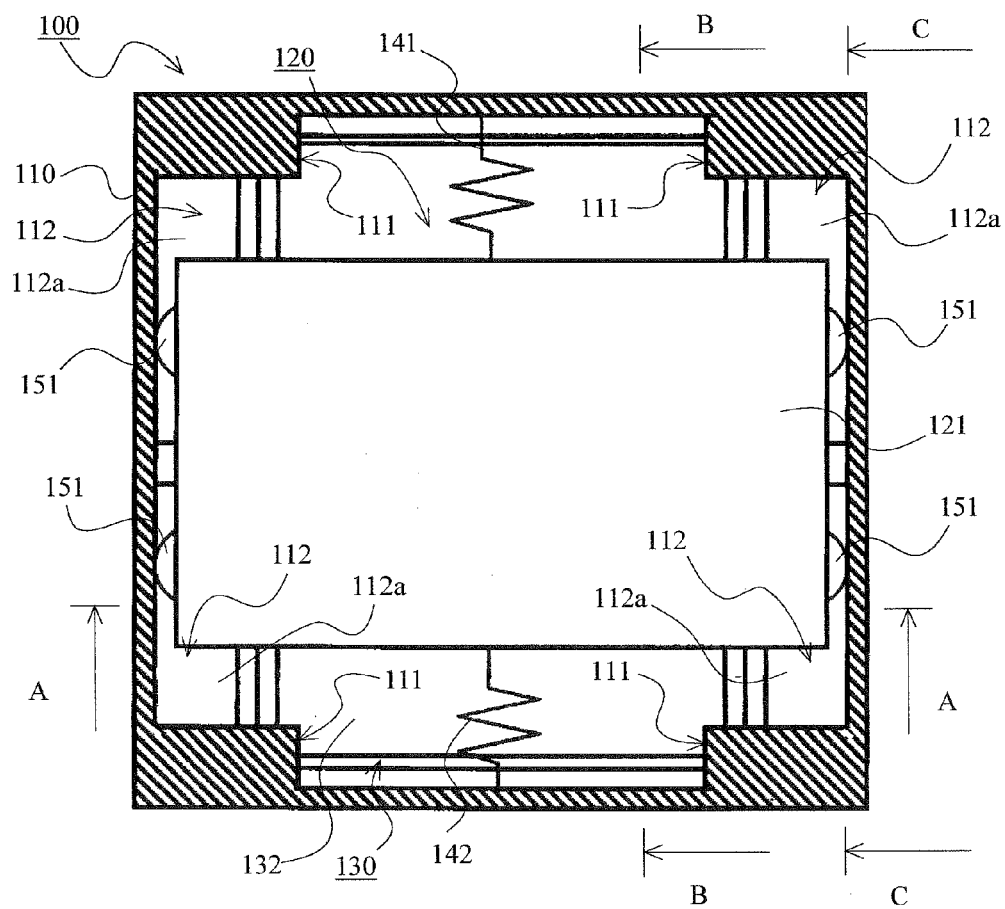
FIG. 1 is a schematic cross-sectional view of an electrostatic induction power generator according to Embodiment 1 of the present invention.
Figure 2:
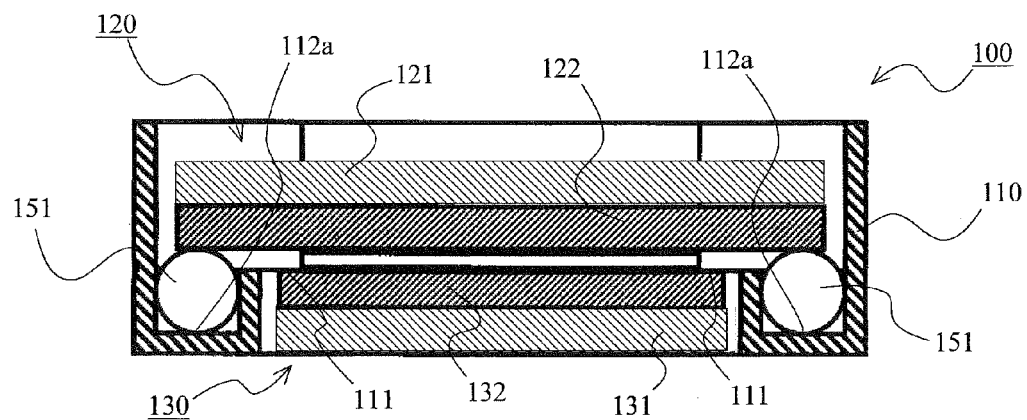
FIG. 2 is a schematic cross-sectional view of the electrostatic induction power generator according to Embodiment 1 of the present invention.
Figure 3:
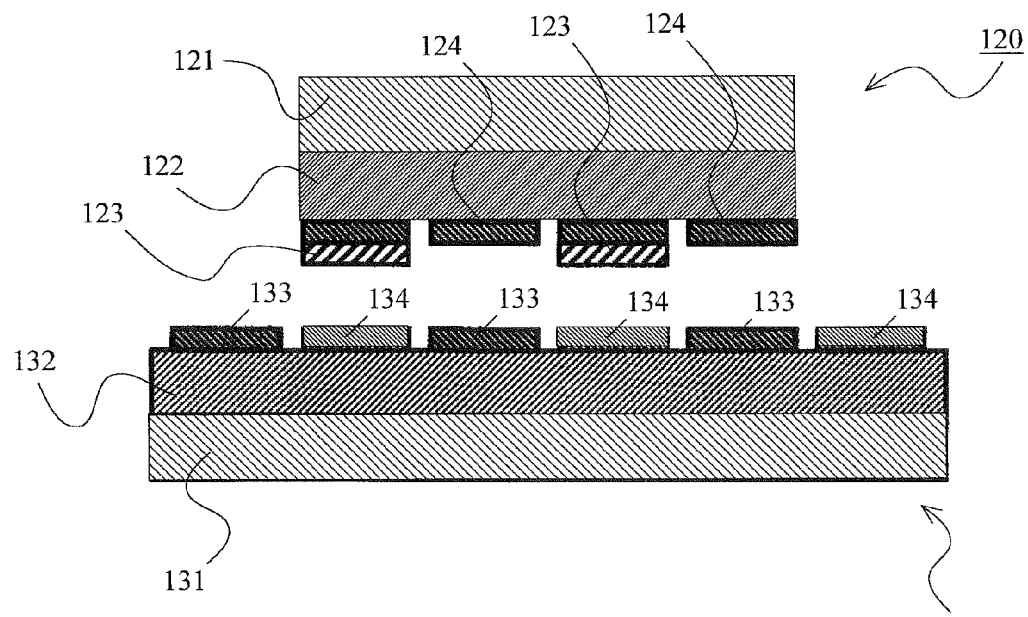
FIG. 3 is a schematic cross-sectional view of major components of the electrostatic induction power generator according to Embodiment 1 of the present invention.
Figure 4:
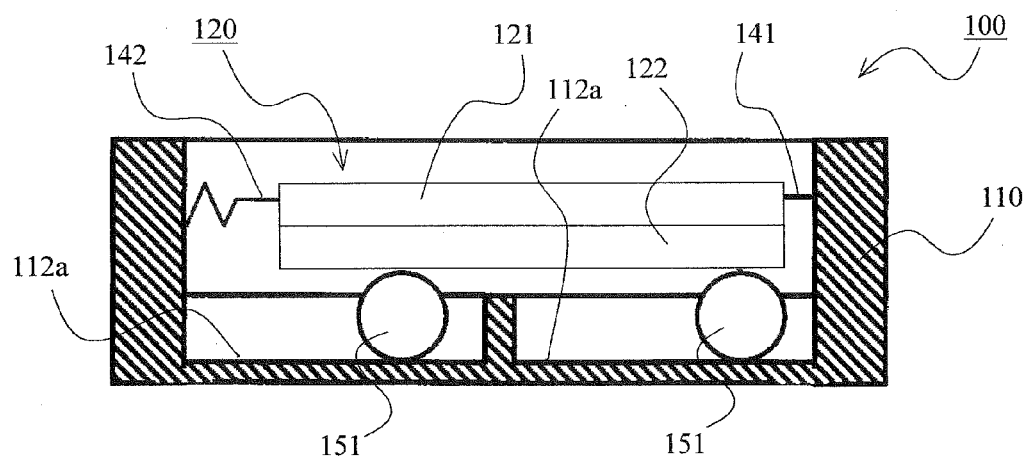
FIG. 4 is a schematic cross-sectional view of the electrostatic induction power generator according to Embodiment 1 of the present invention.

In particular, an overall configuration of the electrostatic induction power generator according to Embodiment 1 of the present invention will be described with reference to FIGS. 1 to 4. FIG. 1 is a schematic cross-sectional view of the electrostatic induction power generator according to the present embodiment. FIG. 1 is a view of the inside of the power generator as seen from the top. FIG. 2 is a schematic cross-sectional view of the electrostatic induction power generator according to the present embodiment. FIG. 2 is a cross-sectional view taken along a line A-A in FIG. 1. FIG. 3 is a schematic cross-sectional view of major components of the electrostatic induction power generator according to the present embodiment. FIG. 3 is a cross-sectional view taken along a line B-B in FIG. 1 (except for a housing and the like). FIG. 4 is a schematic cross-sectional view of the electrostatic induction power generator according to the present embodiment. FIG. 4 is a cross-sectional view taken along a line C-C in FIG. 1.

An electrostatic induction power generator 100 according to the present embodiment includes a housing 110 and also includes a first substrate 120 and a second substrate 130 included inside the housing 110. The first substrate 120 and the second substrate 130 are configured to be able to move relative to each other while maintaining a state in which the first substrate 120 and the second substrate 130 face each other.

The first substrate 120 includes a base substrate 121 formed of a resin material or the like and a glass substrate 122 provided on the base substrate 121. Similarly, the second substrate 130 includes a base substrate 131 formed of a resin material or the like and a glass substrate 132 provided on the base substrate 131.

A plurality of electrets 123, each of which is formed on an electric conductor, and a plurality of guard electrodes 124, all of which are grounded, are alternately arranged in a row on a surface of the first substrate 120 facing the second substrate 130, that is, a surface of the glass substrate 122 (see FIG. 3). In FIGS. 2 and 4, the electrets 123 and the guard electrodes 124 are omitted. In the present embodiment, the electrets 123 are configured to semipermanently hold a negative electric charge.

A plurality of pairs of electrodes (referred to as "first electrode 133" and "second electrode 134") are arranged in a row on a surface of the second substrate 130 facing the first substrate 120, that is, a surface of the glass substrate 132 (see FIG. 3). In FIG. 2, the first electrode 133 and the second electrode 134 are omitted. The plurality of the first electrodes 133 included in the pairs are electrically connected to each other and the plurality of the second electrodes 134 are also electrically connected to each other.

In the present embodiment, the second substrate 130 is fixed to the housing 110. On the other hand, both ends of the first substrate 120 are fixed by springs 141 and 142, so that the first substrate 120 is configured to move (vibrate) with respect to the housing 110. Thereby, the first substrate 120 and the second substrate 130 are configured to be able to move relative to each other while maintaining a state in which the first substrate 120 and the second substrate 130 face each other. The plurality of electrets 123 and guard electrodes 124 are configured to be alternately arranged in a direction of relative movement of the first substrate 120 and the second substrate 130. The first electrodes 133 and the second electrodes 134 are configured to be alternately arranged in the direction of relative movement of the first substrate 120 and the second substrate 130.

The first substrate 120 and the second substrate 130 are configured to be able to move relative to each other while maintaining a state in which the first substrate 120 and the second substrate 130 face each other and are in parallel with each other, that is, while maintaining a state in which a distance between the surfaces facing each other is constant. Here, as described in Background Art, it is important to improve the accuracy of the distance between the electret and a pair of electrodes in a direction in which the pair of substrates face each other in order to improve power generation performance. Generally, it is easy to improve the accuracy of thicknesses of the electret 123 and various electrodes, so that it is important to improve the accuracy of the distance between the surfaces facing each other of the pair of substrates. Therefore, the electrostatic induction power generator 100 according to the present embodiment is configured to be able to easily improve the accuracy of the distance between the surfaces of the first substrate 120 and the second substrate 130 facing each other. Hereinafter, the positioning of the first substrate 120 and the second substrate 130 will be described in detail.

<Positioning of the First Substrate and the Second Substrate>

In the description below, a direction perpendicular to the surfaces facing each other of the first substrate 120 and the second substrate 130 is referred to as "facing direction" for the convenience of description. The facing direction corresponds to a direction perpendicular to the page in FIG. 1, and corresponds to an up-and-down direction in FIGS. 2 to 4.

Both of the first substrate 120 and the second substrate 130 are a rectangular substrate as seen in the facing direction.

The electrostatic induction power generator 100 according to the present embodiment is provided with spherical members 151, which are rotatable members functioning as regulating members, in order to make the distance between the first substrate 120 and the second substrate 130 constant. Specific examples of the spherical member 151 include a steel ball (a ball formed of metal) and a ball formed of a ceramic material.

The second substrate 130 is fixed to the housing 110 of the present embodiment and the housing 110 is provided with first reference surfaces 111, which are positioning references for the second substrate 130. The first reference surface 111 is provided at four positions in order to position and support the four corners of the second substrate 130. When fixing the second substrate 130 to the housing 110, four corners of the surface (that is, the glass substrate 132) of the second substrate 130 facing the first substrate 120 are closely attached to the first reference surfaces 111 at four positions and fixed. Thereby, the positioning of the second substrate 130 in the facing direction is performed. As a specific fixing method, an appropriate publicly known technique, such as adhesive bonding and screw fastening, can be used.

Guide grooves 112 for guiding the spherical members 151 are provided in the housing 110 in a state in which the spherical members 151 can slide and roll along the guide grooves 112. The guide groove 112 is provided at four positions on both sides and front and rear sides in the moving direction of the first substrate 120. All of the guide grooves 112 at four positions are provided to extend in the moving direction of the first substrate 120. One spherical member 151 is disposed in each of the guide grooves 112 at four positions. Each of the spherical members 151 is configured to slide and roll on a bottom surface of the guide groove 112. Thereby, the positioning of the spherical members 151 in the facing direction is performed. In other words, the bottom surface of the guide groove 112 is a second reference surface 112a, which is the positioning reference for the spherical member 151 in the facing direction. The width of the guide groove 112 is configured to be wider than the diameter of the spherical member 151 by a predetermined clearance in order not to prevent rotation of the spherical member 151.

The first substrate 120 is provided to be in contact with the four spherical members 151 disposed in each of the four guide grooves 112 as described above. In the first substrate 120, the surface (that is, the glass substrate 122) facing the second substrate 130 is slidably in contact with the four spherical members 151. Thereby, each of the four spherical members 151 rolls along the guide groove 112 in the guide groove 112, in which the spherical member 151 is disposed, in conjunction with the movement of the first substrate 120.

By the configuration as described above, the accuracy of the distance between the surfaces of the first substrate 120 and the second substrate 130 facing each other is improved. When the first substrate 120 moves (vibrates), the first substrate 120 and the second substrate 130 move relative to each other while maintaining a state in which the first substrate 120 and the second substrate 130 face each other and are in parallel with each other, that is, while maintaining a state in which the distance between the surfaces facing each other is constant.

<Power Generation Principle>

Figure 5:
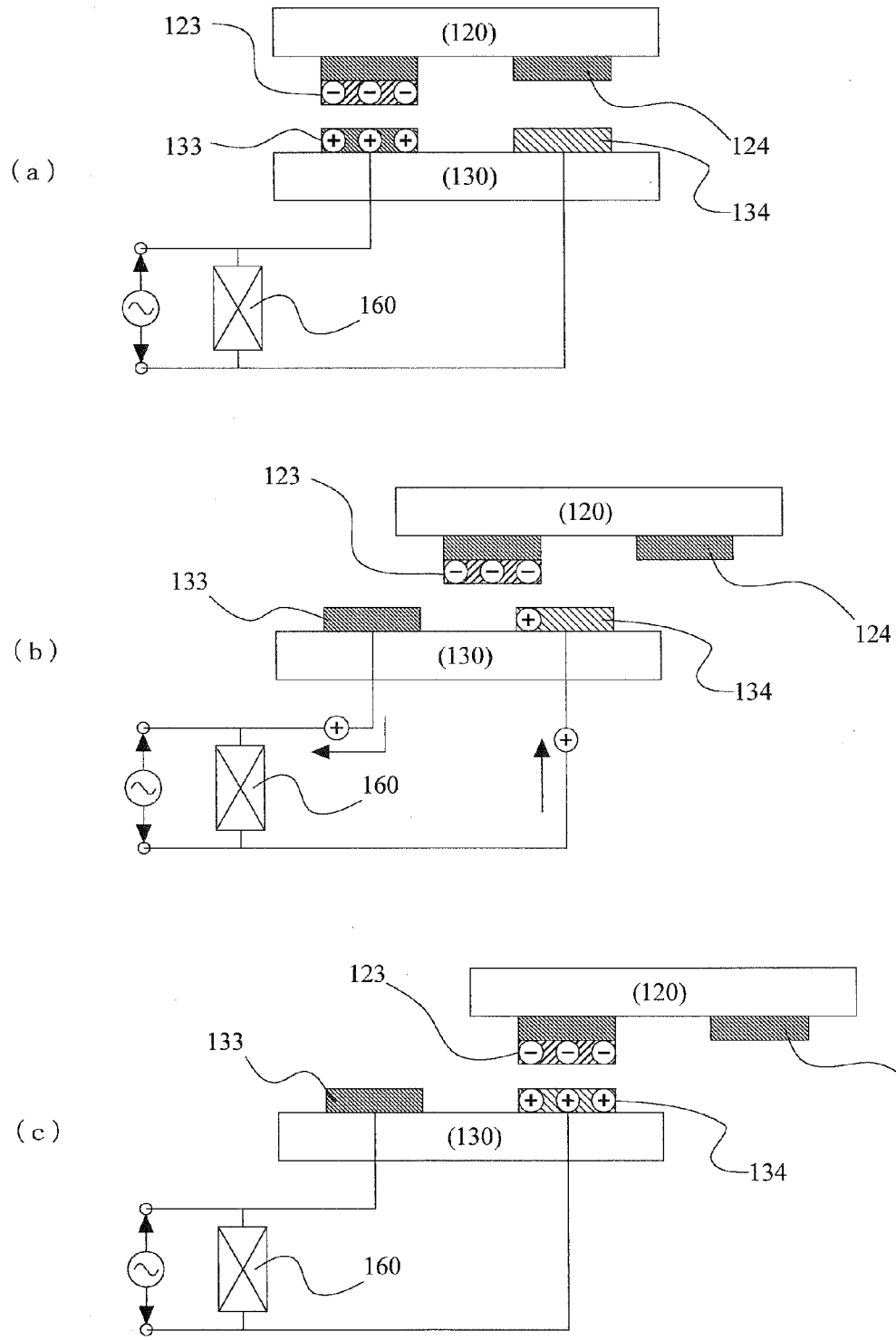
FIG. 5 is a diagram for explaining a power generation principle of the electrostatic induction power generator according to Embodiment 1 of the present invention.

The power generation principle of the electrostatic induction power generator according to the embodiments of the present invention will be described with reference to FIGS. 5 and 6. FIG. 5 is a schematic diagram of the first substrate 120 and the second substrate 130, so that for the convenience of description, only one electret 123, guard electrode 124, first electrode 133, and second electrode 134 are shown.

When the first substrate 120 moves, a relative positional relationship between the first substrate 120 and the second substrate 130 changes. Accordingly, a positional relationship between the electret 123 and the first electrode 133 changes and a positional relationship between the electret 123 and the second electrode 134 changes. FIG. 5(*a*) shows a state in which the entire electret 123 and the entire first electrode 133 face each other and the electret 123 and the second electrode 134 do not face each other at all. FIG. 5(*b*) shows a state in which the electret 123 and the first electrode 133 do not face each other at all and a part of the electret 123 and a part of the second electrode 134 face each other. FIG. 5(*c*) shows a state in which the entire electret 123 and the entire second electrode 134 face each other and the electret 123 and the first electrode 133 do not face each other at all.

In the state shown in FIG. 5(*a*), an electrostatic capacitance between the electret 123 and the first electrode 133 is maximum. At this time, there can be an electrostatic capacitance between the electret 123 and the second electrode 134. In the state shown in FIG. 5(*c*), an electrostatic capacitance between the electret 123 and the second electrode 134 is maximum. At this time, there can be an electrostatic capacitance between the electret 123 and the first electrode 133. In this way, when the first substrate 120 moves, the electrostatic capacitance between the electret 123 and the first electrode 133 changes and the electrostatic capacitance between the electret 123 and the second electrode 134 changes.

FIG. 5(*b*) shows a transitional state from the state shown in FIG. 5(*a*) to the state shown in FIG. 5(*c*). In this transitional process, the electrostatic capacitance between the electret 123 and the first electrode 133 decreases and the electrostatic capacitance between the electret 123 and the second electrode 134 increases. Therefore, since the first electrode 133 and the second electrode 134 are electrically connected to each other via the load 160, a positive electric charge moves from the first electrode 133 to the second electrode 134. In this way, electric power is generated.

Figure 6:
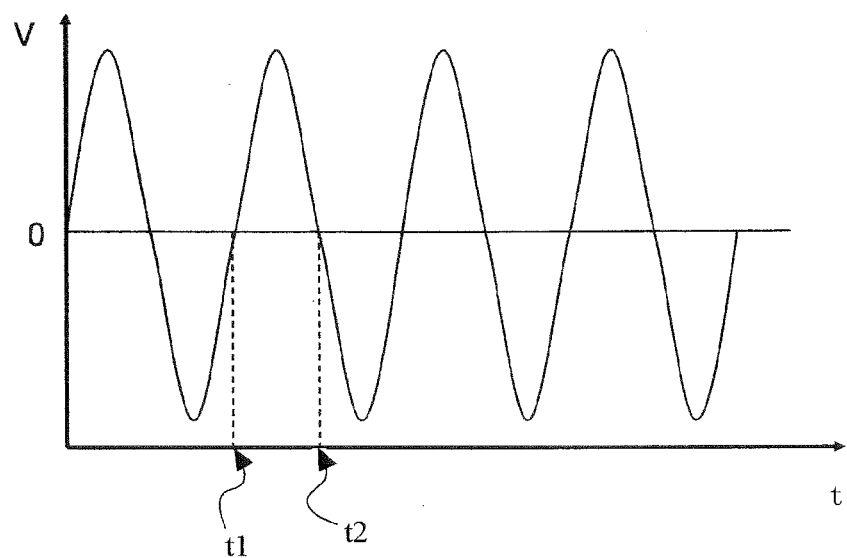
FIG. 6 is a diagram showing an output voltage of the electrostatic induction power generator according to Embodiment 1 of the present invention.

FIG. 6 shows a graph showing variation of output voltage V with respect to elapsed time t in a case in which the state shown in FIG. 5(*a*) and the state shown in FIG. 5(*c*) alternately appear with a regular period (the first substrate 120 vibrates (reciprocates) with a regular period). In FIG. 6, t1 corresponds to the state shown in FIG. 5(*a*) and t2 corresponds to the state shown in FIG. 5(*c*).

Here, as shown in FIG. 6, it is desired that the output voltage curve is drawn so that the center voltage between the high voltage and the low voltage is 0 (V) in order to obtain a stable output voltage. In the present embodiment, the guard electrode 124 is provided, so that the center voltage between the high voltage and the low voltage of the output voltage can be 0 (V). Specifically, for example, as shown in FIG. 5(*a*), when the electret 123 and the first electrode 133 face each other and the grounded guard electrode 124 and the second electrode 134 face each other, the potential of the second electrode 134 is 0 (V) due to Kirchhoff's law. In the state shown in FIG. 5(*c*), the first electrode 133 and the guard electrode 124 (omitted in FIG. 5(*c*)) face each other, so that the potential of the first electrode 133 is 0 (V). Therefore, it is possible to obtain an output voltage curve as shown in FIG. 6, so that a stable output voltage can be obtained. It is possible to employ a configuration in which the guard electrode is not grounded. When the guard electrode is not grounded, an electrostatic capacitance is formed between the first electrode and the second electrode, so that the voltage (amount of generated power) can be more stabilized than a case in which the guard electrode is not provided. However, when the guard electrode is grounded, as de scribed above, the center voltage between the high voltage and the low voltage can be 0 (V), so that the voltage (amount of generated power) can be much more stabilized.

<Excellent Points of the Present Embodiment>

According to the electrostatic induction power generator 100 of the present embodiment, a dimensional error that affects the accuracy of the distance between the surfaces of the first substrate 120 and the second substrate 130 facing each other can be reduced to only a dimensional error of the spherical members 151 which are regulating members and a dimensional error of the housing 110. Thereby, it is possible to eliminate effects of a dimensional error of the thickness of the substrates, which affects the distance between the surfaces of the first substrate 120 and the second substrate 120 facing each other.

It is possible to improve the dimensional accuracy of the housing 110 obtained by resin molding or the like and the spherical members 151 formed of a steel ball or the like. For example, when manufacturing the housing 110 by resin molding, it is possible to reduce the tolerance of the distance between the first reference surface 111 and the second reference surface 112*a* in the facing direction to ±8 μm with respect to a desired dimension. When a steel ball is employed as the spherical member 151, it is possible to reduce the tolerance of the spherical member 151 to ±1 μm or less. Therefore, according to the electrostatic induction power generator 100 of the present embodiment, the dimensional error that affects the accuracy of the distance between the surfaces of the first substrate 120 and the second substrate 130 facing each other can be reduced to ±10 μm or less even when the dimensional error is estimated to be largest.

On the other hand, the tolerance of the glass substrate 122 included in the first substrate 120 and the glass substrate 132 included in the second substrate 130 is ±50 μm with respect to a desired dimension (thickness). In the electrostatic induction power generator 100, the distance between the electret 123 and the first electrode 133 or the second electrode 134 in the facing direction is, for example, about 70 μm and the distance between the surfaces of the first substrate 120 and the second substrate 130 facing each other is, for example, about 85 μm. Therefore, it is possible to eliminate the effects of the dimensional error of the thickness of the substrates, which affects the distance between the surfaces of the first substrate 120 and the second substrate 120 facing each other, by the present embodiment, so that the accuracy of the distance can be improved.

Figure 7:
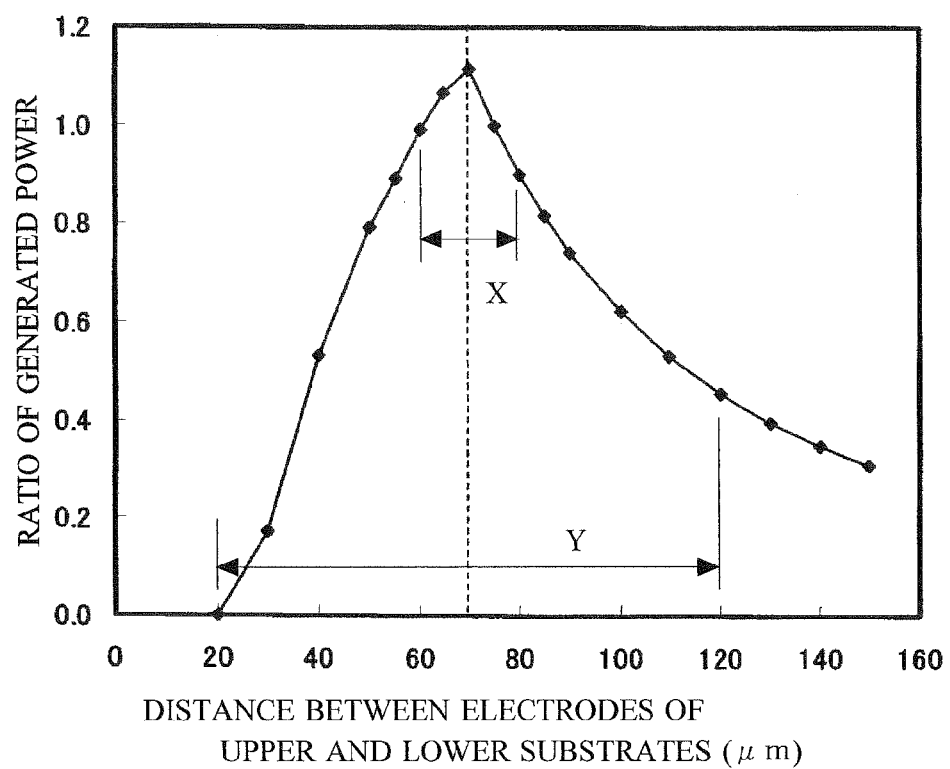
FIG. 7 is a graph showing a relationship between a distance between electrodes and a ratio of amount of generated power.

This will be described in more detail with reference to FIG. 7. FIG. 7 shows a relationship between the distance between the electrodes of the upper and lower substrates (which corresponds to the distance between the electret 123 and the first electrode 133 or the second electrode 134 in the facing direction in the present embodiment) and a ratio of amount of generated power. The ratio of amount of generated power is a ratio when the amount of power generated when the distance between the electrodes of the upper and lower substrates is 65 μm is assumed to be 1.

For example, when the distance between the electrodes of the upper and lower substrates is set to 70 μm, if the dimensional error (±50 μm) of the glass substrates affects, variation occurs in a range shown by Y in the graph, so that the ratio of generated power is unstable. Therefore, the adjustment of the distance between the substrates is troublesome. On the other hand, as described in the present embodiment, the dimensional error that affects the accuracy of the distance between the surfaces of the first substrate 120 and the second substrate 130 facing each other can be reduced to ±10 μm or less. Therefore, in the present embodiment, the variation can be reduced to a range shown by X in the graph, so that the amount of generated power can be stabilized. Therefore, it is not necessary to prepare a plurality of types of adjustment members 240 whose lengths are different from each other or adjust the length of the adjustment member 240 for each product as in the conventional example.

A relationship between the distance between a pair of substrates and the amount of generated power will be briefly described. When the pair of electrodes have the same configuration of the same material and the pair of substrates move (reciprocate) relative to each other so that the substrates vibrate at a constant oscillation frequency f, the maximum output power Pmax is calculated as follows according to Boland and others.

$$P\max = \sigma^2 nAf \div [2(\epsilon_e \epsilon_0 / d) \times ((\epsilon_e g / d) + 1)]$$

Here, σ is surface charge density of the electret, n is [amplitude of the pair of substrates÷pitch of the electrets], A is an maximum area where the electrets and the electrodes overlap each other, $\epsilon_e$ is a relative permittivity of the electret, d is a thickness of the electret, $\epsilon_0$ is a permittivity of vacuum, and g is a distance between the surface of the electret and the surface of the electrode facing the electret (see Non-Patent Literature 1).

In the present embodiment, the spherical member 151 is configured to roll on the second reference surface 112a which is the bottom surface of the guide groove 112 in conjunction with the movement of the first substrate 120. Therefore, it is possible to reduce as much as possible the sliding resistance between the first substrate 120 and the spherical member 151 and between the spherical member 151 and the second reference surface 112a, so that the first substrate 120 can be smoothly moved. Thereby, the first substrate 120 moves (vibrates) even by a small vibration, so that it is possible to improve power generation efficiency.

A configuration in which the second substrate 130 is fixed at four corners is employed, so that it is possible to stably support the second substrate 130 while preventing adverse effects to an area where the power generation is performed (the area where the first electrodes 133 and the second electrodes 134 are provided).

Embodiment 2

Figure 8:
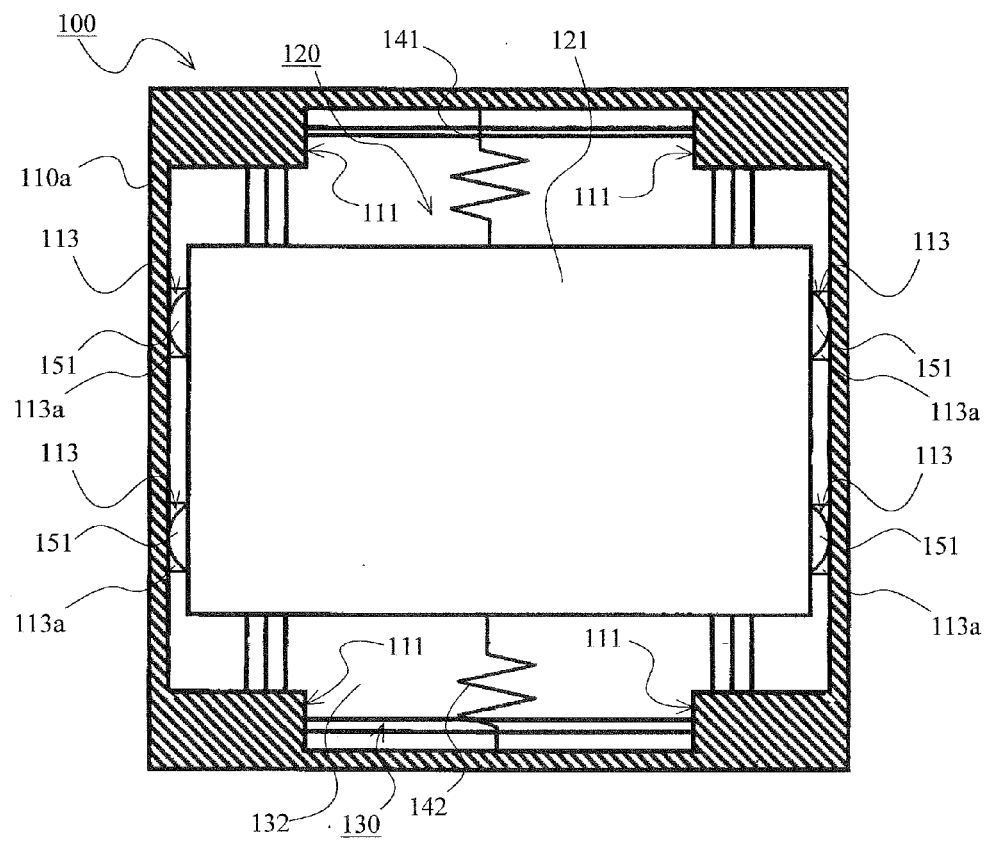
FIG. 8 is a schematic cross-sectional view of an electrostatic induction power generator according to Embodiment 2 of the present invention.
Figure 9:
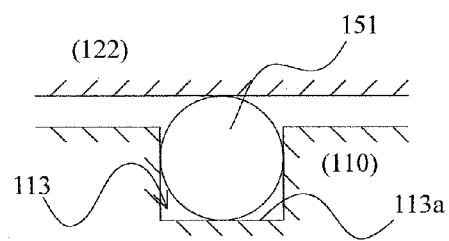
FIG. 9 is a partially enlarged cross-sectional view of the electrostatic induction power generator according to Embodiment 2 of the present invention.

FIGS. 8 and 9 show Embodiment 2 of the present invention. Although, in Embodiment 1 described above, a configuration is described in which the spherical member, which is a rotatable member functioning as a regulating member, rolls along the guide groove, in the present embodiment, a configuration in which the spherical member rotates at a fixed position and does not roll will be described. The other components and functions are the same as those of Embodiment 1, so that the same reference numerals and symbols are given to the same components and the descriptions thereof will be omitted.

FIG. 8 is a schematic cross-sectional view of the electrostatic induction power generator according to the present embodiment. FIG. 8 is a view of the inside of the power generator as seen from the top. FIG. 9 is an enlarged cross-sectional view near the spherical member of the electrostatic induction power generator according to the present embodiment. FIG. 9 shows a cross section in parallel with the moving direction of the first substrate 120.

The housing 110 according to the present embodiment is provided with positioning holes 113 for positioning the spherical member 151 in a state in which the spherical member 151 is slidable. The positioning hole 113 is provided at four positions on both sides and front and rear in the moving direction of the first substrate 120. One spherical member 151 is disposed in each of the positioning holes 113 at four positions. Each of the spherical members 151 is configured to slide on a bottom surface of the positioning hole 113. Thereby, the positioning of the spherical members 151 in the facing direction is performed. In other words, the bottom surface of the positioning hole 113 is a second reference surface 113a, which is the positioning reference for the spherical member 151 in the facing direction. The width and the length in the front-back direction (the moving direction of the first substrate 120) of the positioning hole 113 are configured to be larger than the diameter of the spherical member 151 by a predetermined clearance in order not to prevent rotation of the spherical member 151.

The first substrate 120 is provided to be in contact with the four spherical members 151 disposed in each of the four positioning holes 113 as described above. In the first substrate 120, the surface (that is, the glass substrate 122) facing the second substrate 130 is slidably in contact with the four spherical members 151. Thereby, each of the four spherical members 151 rotates in the positioning hole 113, in which the spherical member 151 is disposed, in conjunction with the movement of the first substrate 120.

As described above, in the electrostatic induction power generator 100 according to the present embodiment, it is also possible to obtain the same effects as those of Embodiment 1 described above except for a point that the spherical members 151 only rotate in the present embodiment, whereas the spherical members 151 roll in Embodiment 1 described above. Whereas the positions at which the four spherical members 151 support the first substrate 120 may change in Embodiment 1 described above, the positions do not change in the present embodiment, so that there is an advantage that the first substrate can be more stably supported. It is necessary to improve the dimensional accuracy of the second reference surface, which is the positioning reference. So, there is also an advantage that the dimensional accuracy can be more improved because, when the bottom surface of the hole is used as the second reference surface, the size of the second reference surface can be reduced compared with a case in which the bottom surface of the groove is used as the second reference surface as in the Embodiment 1 described above. In particular, when manufacturing the housing by resin molding, it is necessary to consider the effects of warp of the housing, so that the housing is manufactured more easily when the bottom surface of the hole is used as the second reference surface. Further, the area of a concave portion of the hole is smaller than that of the groove, so that there is also an advantage that the strength of the housing including the holes is larger than that of the housing including the grooves. Whereas, in a state in which the spherical members are only disposed in the grooves, the spherical members roll in the grooves when assembling the electrostatic induction power generator, the spherical members do not roll when the spherical members are disposed in the holes, so that there is also an advantage that the assembling operation is facilitated.

Embodiment 3

Figure 10:
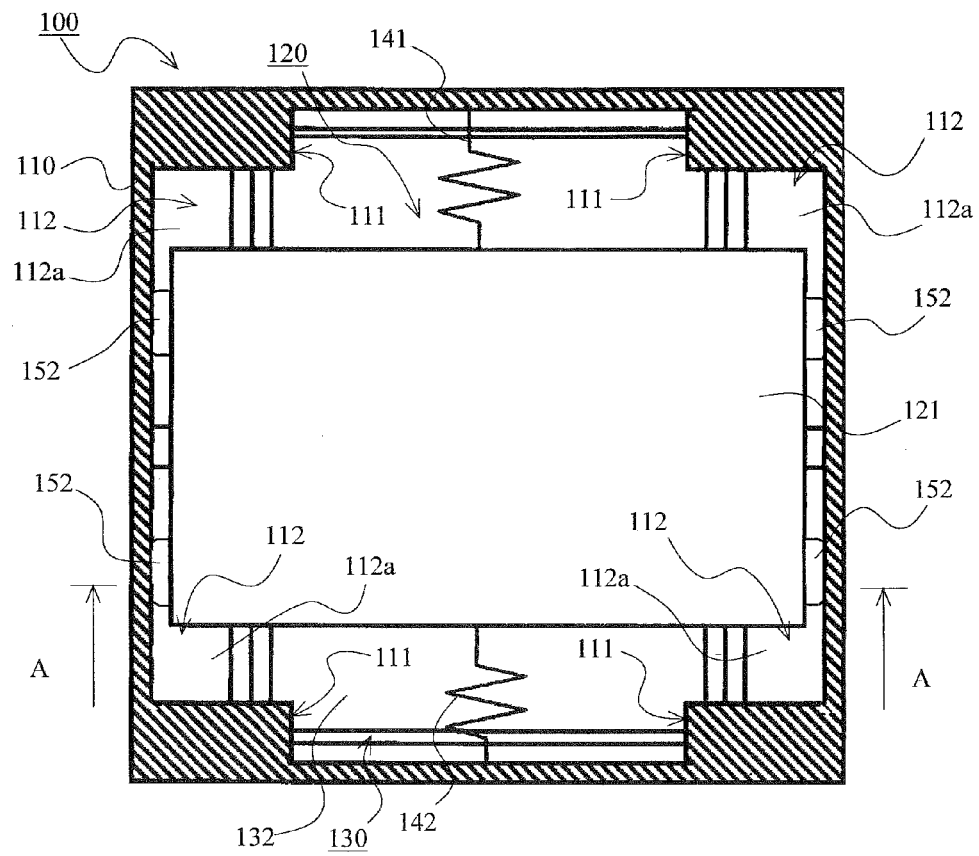
FIG. 10 is a schematic cross-sectional view of an electrostatic induction power generator according to Embodiment 3 of the present invention.
Figure 11:
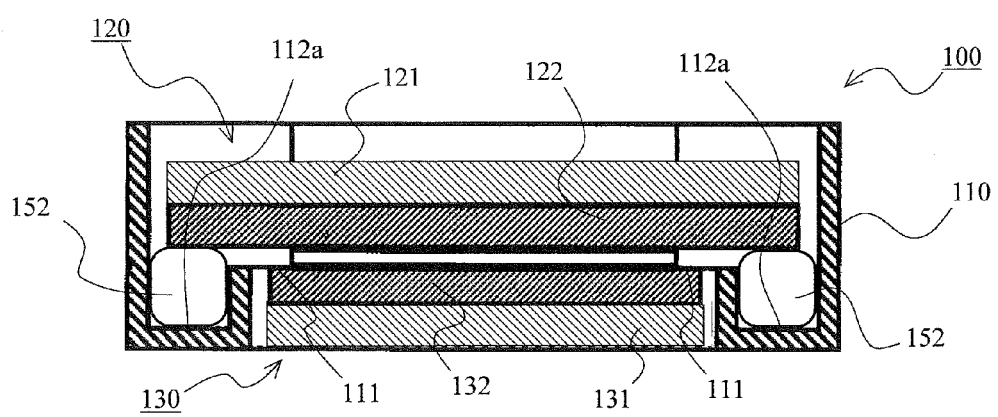
FIG. 11 is a schematic cross-sectional view of the electrostatic induction power generator according to Embodiment 3 of the present invention.
Figure 12:
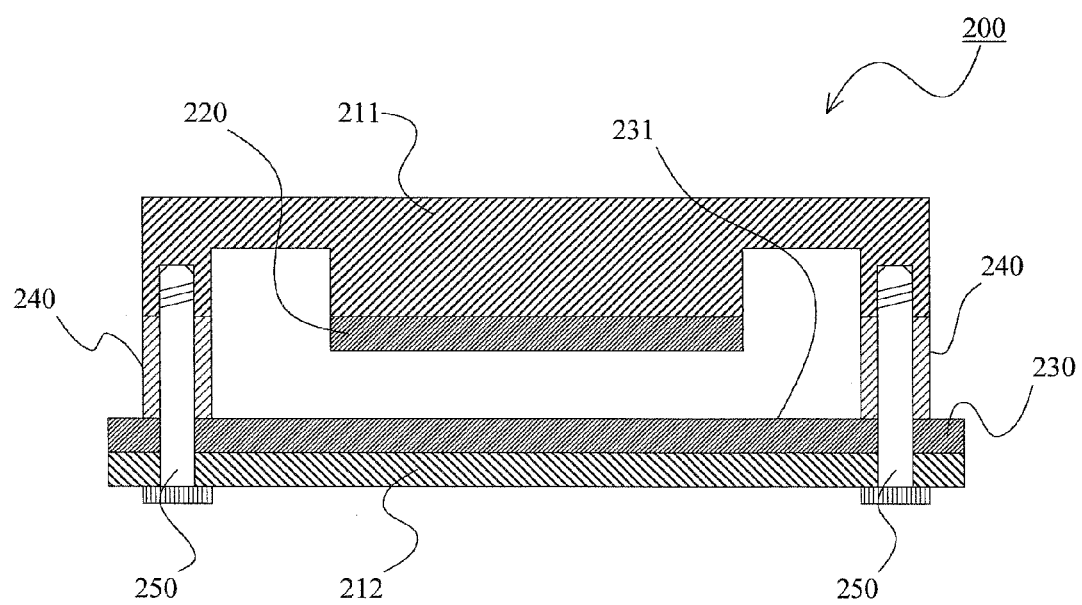
FIG. 12 is a schematic cross-sectional view of an electrostatic induction power generator according to a conventional example.

FIGS. 10 and 11 show Embodiment 3 of the present invention. Although, in Embodiment 1 described above, a case is described in which the rotatable member functioning as a regulating member is the spherical member, in the present embodiment, a case will be described in which the rotatable member is a roller. The other components and functions are the same as those of Embodiment 1, so that the same reference numerals and symbols are given to the same components and the descriptions thereof will be omitted.

FIG. 10 is a schematic cross-sectional view of the electrostatic induction power generator according to the present embodiment. FIG. 10 is a view of the inside of the power generator as seen from the top. FIG. 11 is a schematic cross-sectional view of the electrostatic induction power generator according to the present embodiment. FIG. 11 is a cross-sectional view taken along a line A-A in FIG. 10.

In the present embodiment, the rotatable member functioning as a regulating member disposed in the guide groove 112 is a roller 152. So, the configuration of the present embodiment is the same as that of Embodiment 1 described above except that the rotatable member is a roller instead of the spherical member.

As a material of the roller 152, metal and ceramic can be preferably employed. The width of the guide groove 112 is configured to be wider than the diameter of the spherical member 151 by a predetermined clearance in order not to prevent rotation of the roller 152 and in order to suppress skew of the roller 152.

Needless to say, in the electrostatic induction power generator 100 according to the present embodiment configured as described above, it is possible to obtain the same effects as those of Embodiment 1 described above. Even when a roller is used as the rotatable member, it is possible to employ a configuration in which the rollers are positioned in the positioning holes in the same manner as in Embodiment 2 described above.

Others

In the above embodiments, cases are described, in which the first substrate 120 is configured to be movable with respect to the housing 110 and the second substrate 130 is fixed to the housing 110, so that the first substrate and the second substrate reciprocate relative to each other. This is because that wiring to extract electric power is electrically connected to the second substrate, so that the second substrate is desired to be fixed. However, the second substrate does not necessarily need to be fixed. Therefore, the first substrate may be fixed to the housing 110 and the second substrate may move with respect to the housing 110 so that the first substrate and the second substrate reciprocate relative to each other. Or, both of the first substrate and the second substrate may be configured to be movable with respect to the housing 110 so that the first substrate and the second substrate reciprocate relative to each other.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

100 Electrostatic induction power generator
110 Housing
111 First reference surface
112 Guide groove
112a Second reference surface
113 Positioning hole
113a Second reference surface
120 First substrate
121 Base substrate
122 Glass substrate
123 Electret
124 Guard electrode
130 Second substrate
131 Base substrate
132 Glass substrate
133 First electrode
134 Second electrode
141, 142 Spring
151 Spherical member
152 Roller
160 Load

The invention claimed is:

1. An electrostatic induction power generator comprising:
a first substrate and a second substrate configured to be able to move relative to each other while maintaining a state in which the first substrate and the second substrate face each other;
an electret provided on the first substrate;
a first electrode and a second electrode provided on a surface of the second substrate facing the electret; and
a housing containing the first substrate and the second substrate,
wherein electric power is output when a positional relationship between the electret and the first electrode changes and a positional relationship between the electret and the second electrode changes following a change of relative positions of the first substrate and the second substrate and thereby an electrostatic capacitance between the electret and the first electrode changes and an electrostatic capacitance between the electret and the second electrode changes,
wherein a regulating member for making a distance between opposing surfaces of the first substrate and the second substrate constant is provided,
wherein the housing is provided with
a first reference surface to which the opposing surface of one of the two substrates is fixed, the first reference surface being a positioning reference for positioning the opposing surface of the one substrate in an opposing direction that is perpendicular to the opposing surfaces; and
a second reference surface with which the regulating member is slidably in contact, the second reference surface being a positioning reference for positioning the regulating member in the opposing direction, and
wherein the regulating member is slidably in contact with the opposing surface of the other of the two substrates.

2. The electrostatic induction power generator according to claim 1, wherein the regulating member is a rotatable member that rotates in conjunction with a movement of the other substrate.

3. The electrostatic induction power generator according to claim 2, wherein the rotatable member is a spherical member.

4. The electrostatic induction power generator according to claim 2, wherein the rotatable member is a roller.

5. The electrostatic induction power generator according to claim 2, wherein the housing is provided with a guide groove that guides the rotatable member so that the rotatable member can roll and a bottom surface of the guide groove is the second reference surface.

6. The electrostatic induction power generator according to claim 1, wherein the one substrate has a rectangular shape as seen in the opposing direction and the first reference surface is provided for each of four corners of the one substrate.

7. The electrostatic induction power generator according to claim 3, wherein the housing is provided with a guide groove that guides the rotatable member so that the rotatable member can roll and a bottom surface of the guide groove is the second reference surface.

8. The electrostatic induction power generator according to claim 4, wherein the housing is provided with a guide groove that guides the rotatable member so that the rotatable member can roll and a bottom surface of the guide groove is the second reference surface.

9. The electrostatic induction power generator according to claim 2, wherein the one substrate has a rectangular shape as seen in the opposing direction and the first reference surface is provided for each of four corners of the one substrate.

10. The electrostatic induction power generator according to claim 3, wherein the one substrate has a rectangular shape as seen in the opposing direction and the first reference surface is provided for each of four corners of the one substrate.

11. The electrostatic induction power generator according to claim 4, wherein the one substrate has a rectangular shape as seen in the opposing direction and the first reference surface is provided for each of four corners of the one substrate.

12. The electrostatic induction power generator according to claim 5, wherein the one substrate has a rectangular shape as seen in the opposing direction and the first reference surface is provided for each of four corners of the one substrate.

13. The electrostatic induction power generator according to claim 7, wherein the one substrate has a rectangular shape as seen in the opposing direction and the first reference surface is provided for each of four corners of the one substrate.

14. The electrostatic induction power generator according to claim 8, wherein the one substrate has a rectangular shape as seen in the opposing direction and the first reference surface is provided for each of four corners of the one substrate.

15. The electrostatic induction power generator according to claim 1, wherein the opposing surface of one of the two substrates is aligned and fixed to the first reference surface.

* * * * *